United States Patent [19]
Stiner et al.

[11] 3,922,008
[45] Nov. 25, 1975

[54] LIQUID COOLED METER RISER

[75] Inventors: Roy E. Stiner; John David Johnston, both of Tulsa, Okla.

[73] Assignee: Continental Industries, Inc., Tulsa, Okla.

[22] Filed: Aug. 26, 1974

[21] Appl. No.: 500,548

[52] U.S. Cl. .............. 285/41; 165/45; 165/105; 285/47; 285/138; 285/249
[51] Int. Cl.² .................................. F16L 53/00
[58] Field of Search .......... 285/41, 174, 47, 15, 30, 285/48, 50, 53, 54, 52, 249, 133 R, 138; 165/45, 105; 138/32, 34, 114; 137/340

[56] References Cited
UNITED STATES PATENTS

| | | | |
|---|---|---|---|
| 2,937,009 | 5/1960 | Anderson | 165/105 X |
| 3,244,438 | 4/1966 | Bucheit | 285/15 |
| 3,861,719 | 1/1975 | Hond | 285/47 |

FOREIGN PATENTS OR APPLICATIONS

561,543  8/1958  Canada.............................. 138/34

Primary Examiner—Dave W. Arola
Attorney, Agent, or Firm—Head & Johnson

[57] ABSTRACT

A meter riser for connecting normally buried plastic pipe to metallic couplings which are normally disposed above the ground for connection with utility meters, such as gas meters and the like, and comprising means for connecting the plastic pipe directly to the metallic couplings, said plastic pipe being encased in a metallic sheath, heat sink means surrounding at least a portion of the metallic sheath and plastic pipe to the metallic coupling, and liquid cooling insulating means surrounding at least a portion of the heat sink means and connecting means for protecting the plastic pipe against excessively high temperatures.

6 Claims, 4 Drawing Figures

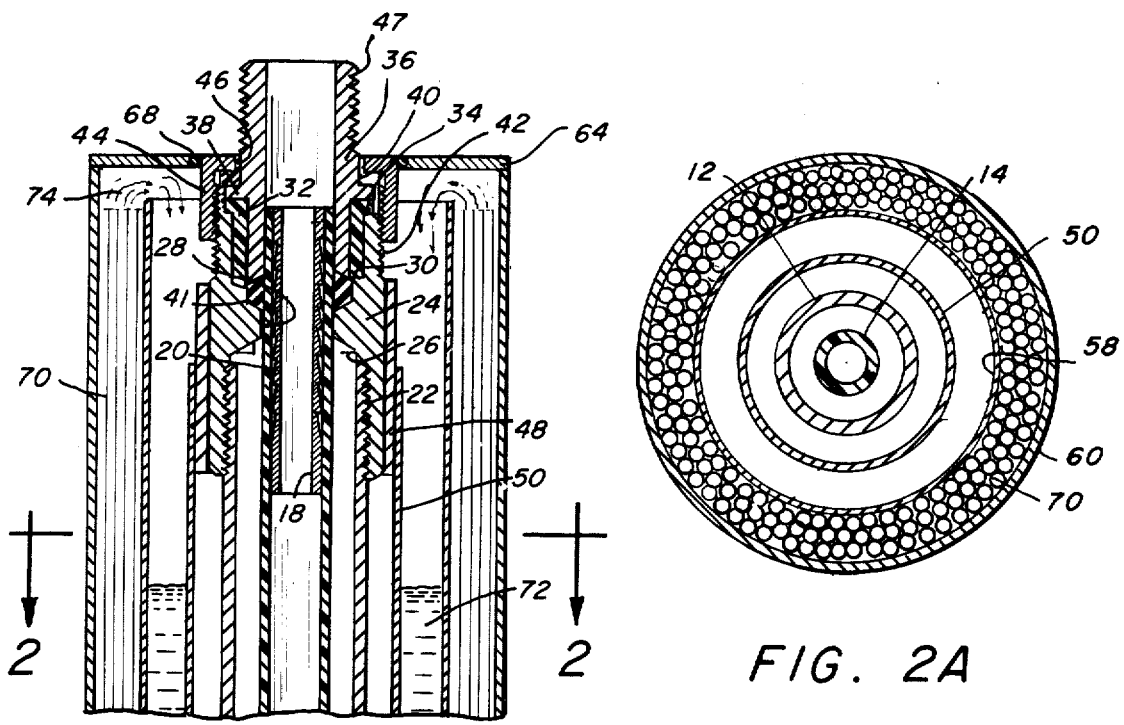
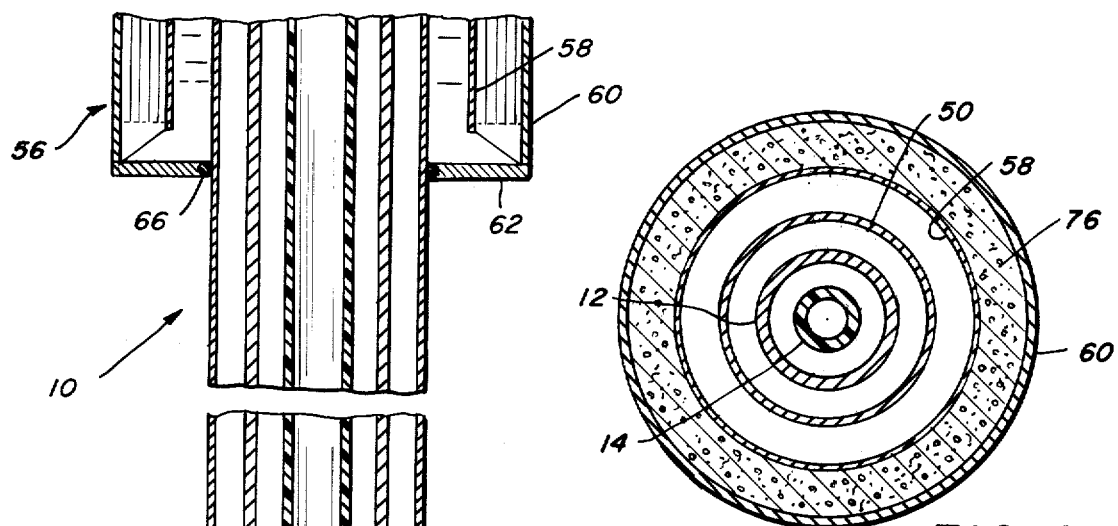
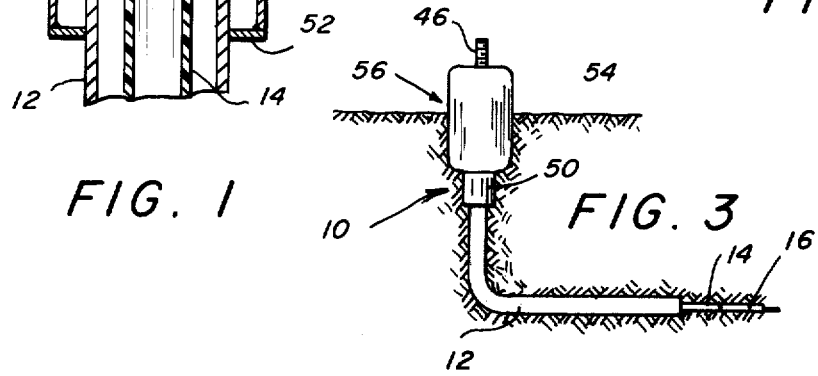
FIG. 1
FIG. 2A
FIG. 2B
FIG. 3

LIQUID COOLED METER RISER

CROSS-REFERENCE TO RELATED APPLICATION

This application is related to a companion application Ser. No. 542,818 prepared and executed substantially simultaneously herewith and entitled "Insulated Line Shield".

BACKGROUND OF THE INVENTION

1. Field of the Invention

This invention relates to improvements in meter risers and more particularly, but not by way of limitation, to an improved means for connecting plastic pipe to metallic connection means and protecting the plastic pipe against excessive heat.

2. Description of the Prior Art

In the gas distribution industry, and the like, wherein natural gas, or other fluids, are transmitted to a plurality of individual consumers by a main distribution system, which is normally buried and which transports or directs the fluid to individual distribution lines having meters interposed therein which are normally disposed above the ground. In the past, the pipe lines of the main distribution system as well as the individual lines and all of the connecting members were metallic, but in recent years the use of plastic has become widespread and it is common practice to use plastic pipe for transmitting the gas or other fluids. A problem exists, however, in that many plastic materials melt or flow at relatively low temperatures, and any exposure of the plastic material to direct sunlight, or relatively high ambient temperatures may deform or otherwise damage the plastic pipe, which may cause undesirable leakage of the gas or fuel therefrom. As a consequence, safety codes in many places prohibit the use of plastic pipe above the surface of the ground for connection with the meter.

In order to overcome this problem, the gas distribution industry, and the like, has provided relatively short lengths of metal pipe, called meter risers, which attach to the buried pipe, and they bend upwardly and extend above the surface of the ground for connection with the meter. One disadvantage of this solution is that the metallic pipe is surrounded by the earth between the connection thereof with the plastic pipe and the surface of the ground, and galvanic action erodes the metallic pipe, causing leakage. As result it is necessary to connect anodes to the metallic pipe, or otherwise protect the metallic pipe from the corrosion due to the galvanic action. In addition, it is necessary to periodically inspect the buried metallic pipe for ascertaining that the anodes are functioning properly, or that the pipe is being properly protected against erosion. It will be apparent that this increases the expense of using metallic pipe, and greatly adds to the inconvenience in the use thereof, rendering the use of metallic meter risers undesirable.

SUMMARY OF THE INVENTION

The present invention contemplates a novel meter riser which has been particularly designed and constructed for overcoming the above disadvantages. The novel meter riser comprises a substantially L-shaped metallic sheath surrounding a plastic pipe complementary to the plastic pipe of the main distribution system, or the like, whereby one end of the plastic pipe within the metallic sheath may be fused or otherwise connected with the plastic pipe of the main gas distribution line. The opposite end of the plastic pipe within the metallic sheath may be connected directly with the metallic coupling or connection member which is connected with the usual meter. Thus, the novel meter riser extends from the buried main distribution line to a point above the ground for connection with the meter coupling. A liquid cooled insulating means is disposed around the novel meter riser at the connection thereof with the meter coupling and extends slightly below the surface of the ground in order to insulate the plastic pipe within the metallic sheath from excessive temperatures. The insulating means also protects the connection portion between the riser and the meter coupling from contact with the earth for substantially eliminating any possible corrosion of the connection from catalytic action. In addition, heat sink means is disposed around a portion of the sheath for reducing heat build up at the plastic pipe therein. Of course, since the gas, or the like, is transmitted from the main distribution system to the meter through the encased plastic pipe, any corrosion of the metallic shield cannot in any manner result in a leakage of fluid from the shielded line. Furthermore, it is preferable that the heat sink means be constructed of copper or the like which is not subject to the catalytic action of the earth. The novel meter riser of the present invention permits the use of plastic pipe for transporting of the gas, or the like, to the meter without the danger of exposing the plastic pipe to extremely high temperature conditions, thus eliminating the disadvantages of metallic pipe interposed between the meter and the plastic pipe without the inherent dangers of using plastic pipe for connection with the meter. The novel liquid cooled meter riser is simple and efficient in operation and economical and durable in construction.

BRIEF DESCRIPTION OF THE DRAWINGS

FIG. 1 is a broken sectional elevational view of an insulated meter riser embodying the invention.

FIG. 2A is a sectional view taken along line 2—2 of FIG. 1 depicting one embodiment of the invention.

FIG. 2B is a view similar to FIG. 2A depicting a modification of the invention.

FIG. 3 is a sectional view partly in elevation depicting an insulated meter riser embodying the invention as installed for connection between a meter and an underground fluid transport line.

DESCRIPTION OF THE PREFERRED EMBODIMENTS

Referring to the drawings in detail, reference character 10 generally indicates a meter riser comprising a substantially L-shaped or curved metallic outer sheath 12 having a centrally disposed plastic tube or pipe 14 extending longitudinally therethrough. The pipe or tubing 14 is preferably of a diametric size and a chemical composition complementary to the usual underground plastic pipe flow line 16 whereby the pipes 14 and 16 may be welded, fused, or otherwise united in end to end relation, as is well known. The pipe 14 is preferably concentrically disposed within the sheath 12 and may be retained therein in any suitable manner (not shown). The free end of the pipe 14 extends beyond the end of the sheath 12 as clearly shown in FIG. 1, and a substantially cylindrical metallic stiffener 18, preferably constructed from steel, but not limited thereto, is inserted longitudinally in the outer or free end of the pipe 14. The stiffener 18 may be of any suitable type, and as shown herein is provided with serrations or teeth 20 on the outer periphery thereof for biting into the inner periphery of the pipe 14 for securely retaining the stiffener 18 therein.

The outer periphery of the end of the sheath 12 in the proximity of the stiffener 18 is threaded as shown at 22 for receiving a suitable metallic line shield nut 24. An inwardly directed annular flange 26 is provided on the inner periphery of the nut 24 spaced from the sheath 12 for providing a reduced diameter bore 28 which may bear against the outer periphery of the pipe 14 for facilitating retaining of the pipe 14 within the sheath 12. An inwardly directed annular shoulder 30 is provided on the inner periphery of the nut 24 spaced from the flange 26 for receiving one end of a suitable insulator sleeve 32 thereagainst. The insulator sleeve 32 is preferably constructed from a suitable plastic material, and may be provided with an outwardly extending circumferential flange 34 at the outer end thereof for bearing against the outer end of the nut 24. A suitable adapter coupling 36, preferably of metallic construction, has one end thereof inserted within the insulator sleeve 34, and is provided with an outwardly extending circumferential flange 38 provided on the outer periphery thereof spaced from the lowermost end thereof as viewed in FIG. 1 for engaging the flange 34 of the insulator sleeve 32. A second flanged plastic insulator sleeve 40 is disposed around the outer periphery of the coupling 36 in engagement with the flange 38 for a purpose as will be hereinafter set forth. In addition a sealing ring 41 preferably constructed of rubber is disposed around the outer periphery of the pipe 14 and interposed between the flange 26 and coupling 36 for precluding a flange therebetween.

The outer end of the nut 24 is externally threaded as shown at 42 for receiving a suitable internally threaded metallic compression nut 44 thereon. The nut 44 is provided with a centrally disposed opening or bore 46 in one end thereof for receiving the coupling 36 therethrough, and may be threadedly secured on the nut 24 in such a manner as to compress the flange insulation sleeve 40 and flange 38 against the flange 34 and the outer end of the nut 24, thus securely retaining the coupling 36 in connection with the nut 24. The outer end of the pipe 14, having the stiffener 18 inserted therein, extends into the interior of the coupling 36, as clearly shown in FIG. 1, and the coupling 36 is externally threaded at the outer end thereof as shown at 47 whereby the coupling 36 may be threadedly secured to the usual fluid meter (not shown) or the like, for connecting the meter riser 10 therewith for a purpose as will be hereinafter set forth.

A spacer sleeve 48 is secured around the outer periphery of the nut 24 in any suitable manner (not shown) for receiving one end of a tubular heat sink 50 therearound. The heat sink 50 is preferably concentrically disposed around the outer periphery of the sheath 12, and the lowermost or exposed end thereof as viewed in FIG. 1 is closed by an annular plate 52 which may be welded or otherwise secured thereto and in engagement with the outer periphery of the sheath 12. The heat sink 50 and annular plate 52 are preferably constructed of copper or any other suitable material which assures that there will be no heat build up around the plastic tubing or pipe 14, particularly as the pipe 14 rises or approaches the surface 54 of the earth. In addition, a liquid cooled insulator assembly 56 is secured around the outer periphery of at least a portion of the heat sink 50, and preferably extends around that portion of the heat sink 50 and nut 24 and coupling 36 which is disposed just beneath the surface 54 of the earth and slightly above the surface, 54, as particularly shown in FIG. 3.

The insulation assembly 56 comprises a pair of concentrically arranged tubes 58 and 60, with the inner tube 58 being a metallic condensation tube, and the outer tube being a metallic environmental shield. The tube 58 may be secured within the tube 60 in any suitable manner (not shown). The outer tube or sleeve 60 is of a greater overall length than the inner sleeve or tube 58, and the opposite ends thereof are closed by annular plates 62 and 64 which may be welded or otherwise rigidly secured thereto. The annular plates 62 and 64 are disposed around the outer peripheries of the heat sink 50 and compression nut 44, respectively, and suitable sealing rings 66 and 68, such as O-rings, are interposed therebetween for precluding leakage of fluid. A suitable capillary tube bundle 70 is disposed in the annulus between the tubes 58 and 60, and may be secured therein in any suitable manner (not shown). In addition, a liquid coolant 72 is maintained in the annulus between the heat sink 50 and the condensation tube 58 and supported by the plate 62 as clearly shown in FIG. 1. The coolant 72 may be of any suitable type, such as a low viscosity liquid, which may be water having anti-freeze mixed therewith, or methane, or the like. The lowermost ends of the capillary tube bundle 70, as viewed in FIG. 1 are open to the coolant, which passes upwardly therethrough by capillary action, and moves out the upper ends of the bundle 70 where it condenses and falls back into the reservoir by gravity, as indicated by the arrows 74. Thus, the plastic tube 14 encased within the insulator 56 is insulated not only from any corrosive action by the surrounding earth or atmosphere but also from any excessive temperature conditions.

In use, the plastic pipe 14 may be connected with the main distribution system 16 in any well known manner, such as by fusing, cementing, or the like, and the sheath 12 will extend upwardly due to its L-shaped configuration whereby the insulator assembly 56 will be at least partially disposed above the surface of the ground, as shown in FIG. 3. The coupling 46 may be connected with the usual meter (not shown) in any suitable manner, such as by a threaded connection, for securing the meter riser 10 between the meter (not shown) and the main distribution system 16. The insulator assembly 56 protects the plastic pipe from excessive ambient temperatures and other atmospheric conditions, and the heat sink 50 protects the coupling 46 and at least a portion of the sheath 12 from catalytic action.

Referring now to FIG 2B, a modification of the invention is shown wherein a capillary fiber bundle 76 is disposed in the annular space between the outer tube 60 and the condensation tube 58 in lieu of the capillary tube bundle 70. The function of the capillary fiber bundle 76 is the same as the function of the capillary tube bundle 70 as hereinbefore set forth.

From the foregoing it will be apparent that the present invention provides a novel liquid cooled meter riser wherein a plastic pipe may be connected directly to the meter coupling. The riser comprises a plastic pipe which may be cemented, welded, fused, or otherwise secured to the normal or usual buried plastic pipe in a flow line distribution system, and a metallic sheath surrounding the plastic pipe and cooperating therewith for connecting the plastic pipe to the usual meter coupling, or the like. A heat sink is disposed around a portion of the plastic pipe and sheath in the proximity thereof which is disposed above the surface of the ground and slightly below the surface of the ground for protecting the sheath against catalytic deterioration, and an insulator is disposed around the upper portion of the heat sink for protecteing the plastic pipe from excessive temperature conditions and other contamination.

Whereas the present invention has been described in particular relation to the drawings attached hereto, it should be understood that other and further modifications, apart from those shown or suggested herein, may be made within the spirit and scope of this invention.

What is claimed:

1. A liquid cooled meter riser comprising a substantially L-shaped metallic sheath member, plastic pipe means concentrically disposed within said sheath member and extending longitudinally therethrough for connection between a buried plastic pipe and a metallic meter coupling, means cooperating with the sheath member and plastic pipe means therein for connection of said plastic pipe means with said meter coupling, heat sink means secured around at least a portion of the sheath and plastic pipe means therein in the proximity of the connection thereof with the meter coupling, and liquid cooled insulator means disposed around at least a portion of the heat sink means for protection thereof from the environment therearound.

2. A liquid cooled meter riser as set forth in claim 1 wherein the heat sink means comprises a copper sleeve secured around said sheath and concentrically arranged with respect thereto.

3. A liquid cooled meter riser as set forth in claim 1 wherein the liquid cooled insulator means comprises a pair of concentrically arranged tube members concentrically secured around a portion of the heat sink, capillary means disposed in the annulus between the said tube members, and liquid coolant reservoir means disposed in the annulus between the heat sink and the innermost of said tube members, said capillary means having one end open to said coolant for passing the coolant longitudinally therethrough by capillary action and recycling the coolant to the reservoir.

4. A liquid cooled meter riser as set forth in claim 3 and including sealing means interposed between the concentrically arranged tube members and the heat sink and meter coupling for precluding leakage of fluid therebetween.

5. A liquid cooled meter riser as set forth in claim 1 wherein the connection means comprises sleeve means for receiving one end of the plastic pipe means therein, threaded sleeve means secured to one end of the sheath and having an inwardly directed annular flange for receiving one end of the first sleeve means thereagainst, insulation means interposed between the first sleeve means and the threaded sleeve means, and compression nut means cooperating between the first sleeve means and threaded sleeve means for securing the first sleeve means to the threaded sleeve means, said first sleeve means being adapted for connection with the meter for securing the plastic pipe means thereto.

6. A liquid cooled meter riser as set forth in claim 6 and including stiffening means disposed within said one end of the plastic pipe means for facilitating securing thereof within said first sleeve means.

* * * * *